United States Patent
Hansen et al.

(10) Patent No.: US 11,432,455 B2
(45) Date of Patent: Sep. 6, 2022

(54) SOLID MATERIAL SPREADER FOR AGRICULTURAL APPLICATIONS

(71) Applicant: BAUER BUILT MANUFACTURING, INC., Paton, IA (US)

(72) Inventors: Adam Hansen, Audubon, IA (US); Garret Johnson, Stratford, IA (US)

(73) Assignee: BAUER BUILT MANUFACTURING, INC., Paton, IA (US)

( * ) Notice: Subject to any disclaimer, the term of this patent is extended or adjusted under 35 U.S.C. 154(b) by 0 days.

(21) Appl. No.: 16/946,004

(22) Filed: Jun. 2, 2020

(65) Prior Publication Data

US 2021/0368670 A1 Dec. 2, 2021

(51) Int. Cl.
*A01C 3/06* (2006.01)
*A01C 17/00* (2006.01)

(52) U.S. Cl.
CPC .............. *A01C 3/06* (2013.01); *A01C 17/001* (2013.01)

(58) Field of Classification Search
CPC ......... A01C 3/06; A01C 3/066; A01C 17/001; A01C 15/001; A01C 15/16; A01F 12/40; E01C 19/20–205; E01C 2019/2055–2095; E01H 10/007; A01D 90/10–16; B65G 53/4625; B65G 53/4633; B65G 53/4641; B65G 29/00–02; B65G 47/244
USPC ....................................................... 239/683
See application file for complete search history.

(56) References Cited

U.S. PATENT DOCUMENTS

| | | | | |
|---|---|---|---|---|
| 1,037,038 A | * | 8/1912 | Mott ..................... | A01C 17/00 239/682 |
| 1,170,673 A | * | 2/1916 | Rice ..................... | A01C 17/00 239/682 |
| 3,603,001 A | * | 9/1971 | Arnold ................. | F26B 11/026 55/432 |
| 3,656,638 A | * | 4/1972 | Hutton ................. | A01D 90/105 239/681 |
| 4,155,486 A | * | 5/1979 | Brown ................. | B65G 53/4633 222/197 |
| 5,501,404 A | * | 3/1996 | Meyer ................... | A01C 3/066 111/11 |
| 7,172,137 B2 | | 2/2007 | Neier et al. | |
| 10,470,354 B2 | * | 11/2019 | Grywacheski ........ | A01C 3/066 |
| 2008/0216849 A1 | * | 9/2008 | Tallier ................ | B65G 53/4633 131/110 |
| 2012/0048956 A1 | | 3/2012 | Stevenson et al. | |
| 2012/0048958 A1 | * | 3/2012 | Stevenson ............. | A01C 3/066 239/1 |

* cited by examiner

*Primary Examiner* — Tuongminh N Pham
*Assistant Examiner* — Juan C Barrera
(74) *Attorney, Agent, or Firm* — McKee, Voorhees & Sease, PLC

(57) ABSTRACT

A spreader for solid manure and other particulate material includes upright rotational beaters having paddles to dispense product from the rear of a wagon onto an agricultural field. The paddles on the beaters overlap along a midpoint between the beaters to improve product distribution on the field. The perimeter edges of the paddles are in close proximity to the side edges of the beater frame to facilitate product sheer, and thus improved distribution. The paddles on each beater are vertically and radially offset, and at least some of the paddles are spring-loaded.

19 Claims, 12 Drawing Sheets

SOLID MATERIAL SPREADER FOR AGRICULTURAL APPLICATIONS

FIELD OF THE INVENTION

The present invention is directed toward a solid material spreader, and particularly to a solid manure spreader, for distributing manure or other particular materials to an agricultural field.

BACKGROUND OF THE INVENTION

For generations, farmers have used animal manure as a natural fertilizer for crop fields. A manure wagon pulled behind a tractor or other vehicle normally includes a conveyor to move the solid manure to the rear of the wagon where rotating paddles dispense the manure behind the wagon onto the field. One problem with conventional manure spreaders is poor or uneven distribution of the material in the field. Plugging of the paddles is another issue of prior art manure spreaders.

Therefore, a primary objective of the present invention is the provision of an improved solid material spreader for distributing material onto the field in an efficient and effective manner.

Another objective of the present invention is the provision of a solid manure spreader with an improved distribution pattern.

A further objective of the present invention is the provision of a material spreader wagon having improved beaters with increased tip speed and material impact to obtain a wider spread of material dispensed from the wagon.

Still another objective of the present invention is the provision of a manure spreader having beaters which act as a flywheel to store energy and maintain rotational speed.

Yet another objective of the present invention is the provision of a manure spreader having rotating paddles which do not become plugged.

A further objective of the present invention is the provision of a particular material spreader having beaters which provide outer perimeter shear of the material for enhanced paddle cleanliness and rotation.

Another objective of the present invention is the provision of improved beaters for a solid material spreader which are economical to manufacture, and durable and safe in use.

These and other objectives become apparent from the following description of the invention.

SUMMARY OF THE INVENTION

The solid material spreader of the present invention includes a wagon with wheels for towing behind a tractor or other vehicle in the field. The wagon includes a conveyor extending from front to back to carry material, such as solid manure, to the rear end of the wagon. The upright beaters at the rear of the wagon have spring-loaded paddles which rotate so as dispensed material from the rear of the wagon onto a field. The paddles overlap along a vertical plane midway between the axis of rotation for the beaters. The paddles have outer edges which reside in close proximity to the outer edges of the wagon so as to shear material as the beaters rotate. Each beater has a plurality of rows of paddles, with each row of paddles being radially offset relative to an adjacent row. The paddles of one beater are vertically offset with respect to paddles on the other beater. The beaters rotate in opposite directions and are inclined forwardly from bottom to top so as to discharge the material in a slightly upward and rearward direction from the wagon.

DETAILED DESCRIPTION OF THE INVENTION

Figure 1:
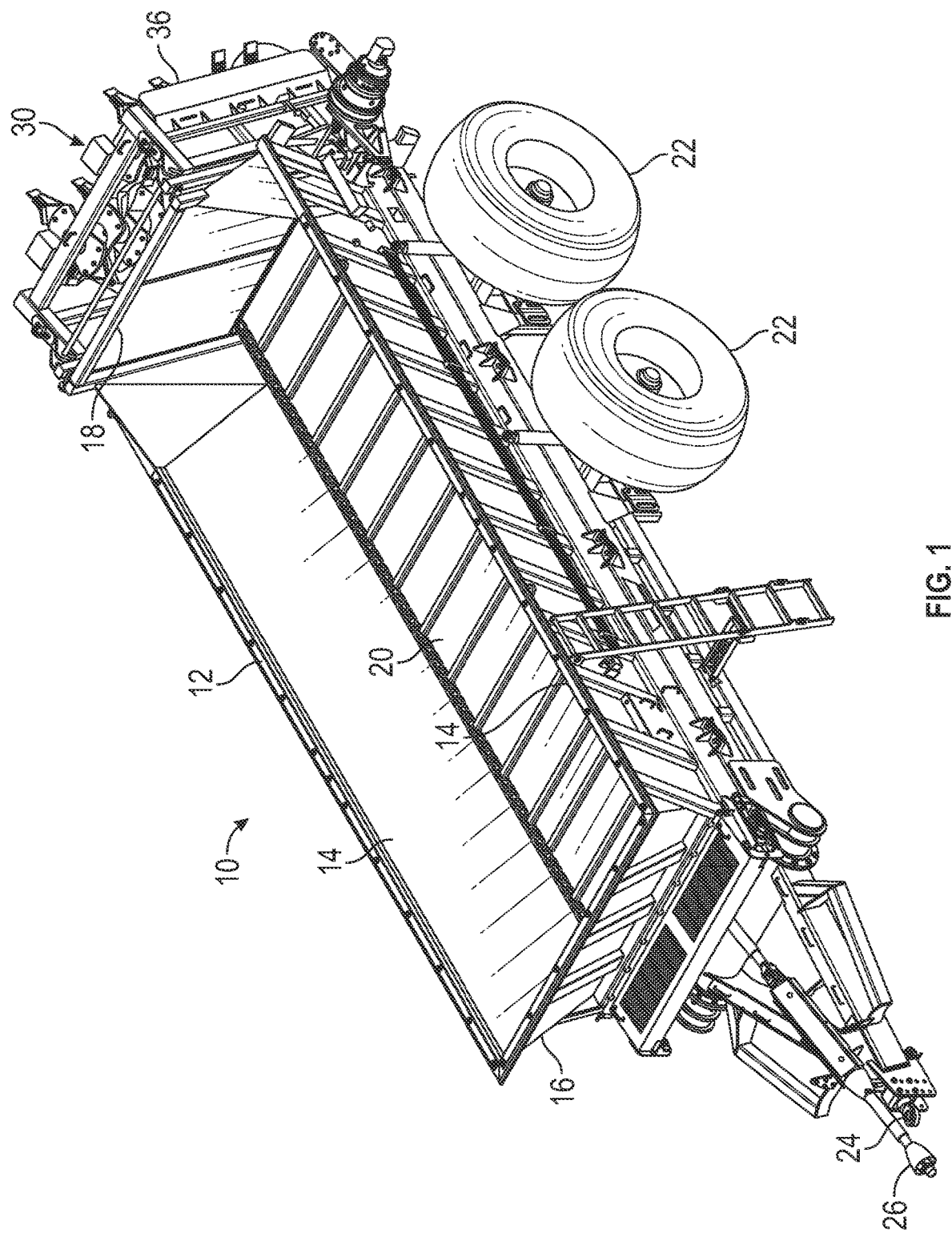
FIG. 1 is a perspective view of the manure or solid material spreader having the novel beaters of the present invention.
Figure 2:
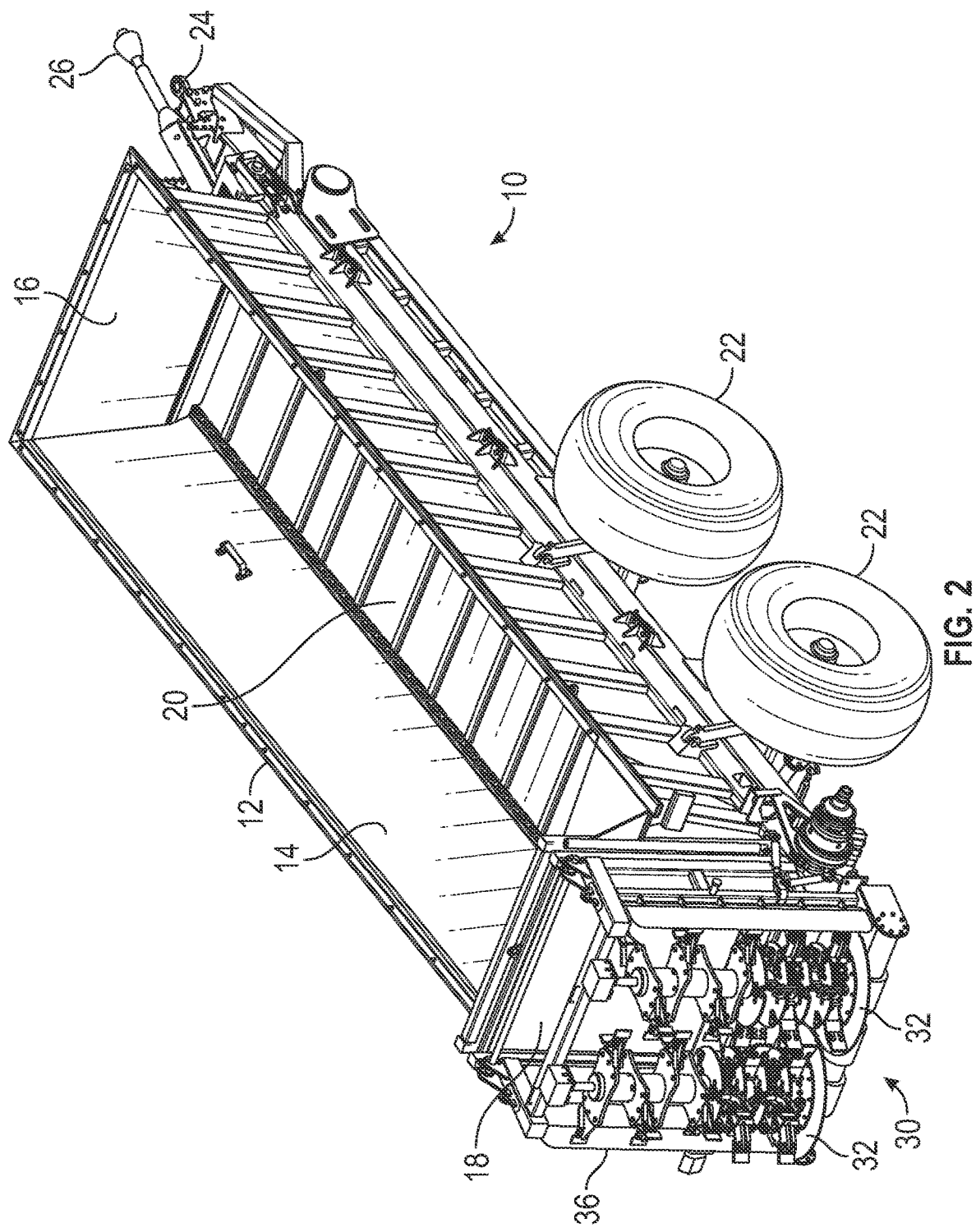
FIG. 2 is another perspective view of the spreader shown in FIG. 1.

A spreader wagon for use with manure and other solid materials is designated by the reference numeral 10 in the drawings. The wagon 10 includes a box 12 defined by opposite sidewalls 14, a front wall 16, and an open rear 18. The bottom of the box 12 includes a conveyor 20. The wagon 10 also includes wheels 22, and a frame with a tongue 24 for hitching to a tractor or other vehicle. A PTO shaft 26 connects to the tractor PTO for driving the conveyor 20.

The construction of the wagon 10, described above, is conventional, and may take other forms, without departing from the scope of the present invention.

Figure 3:
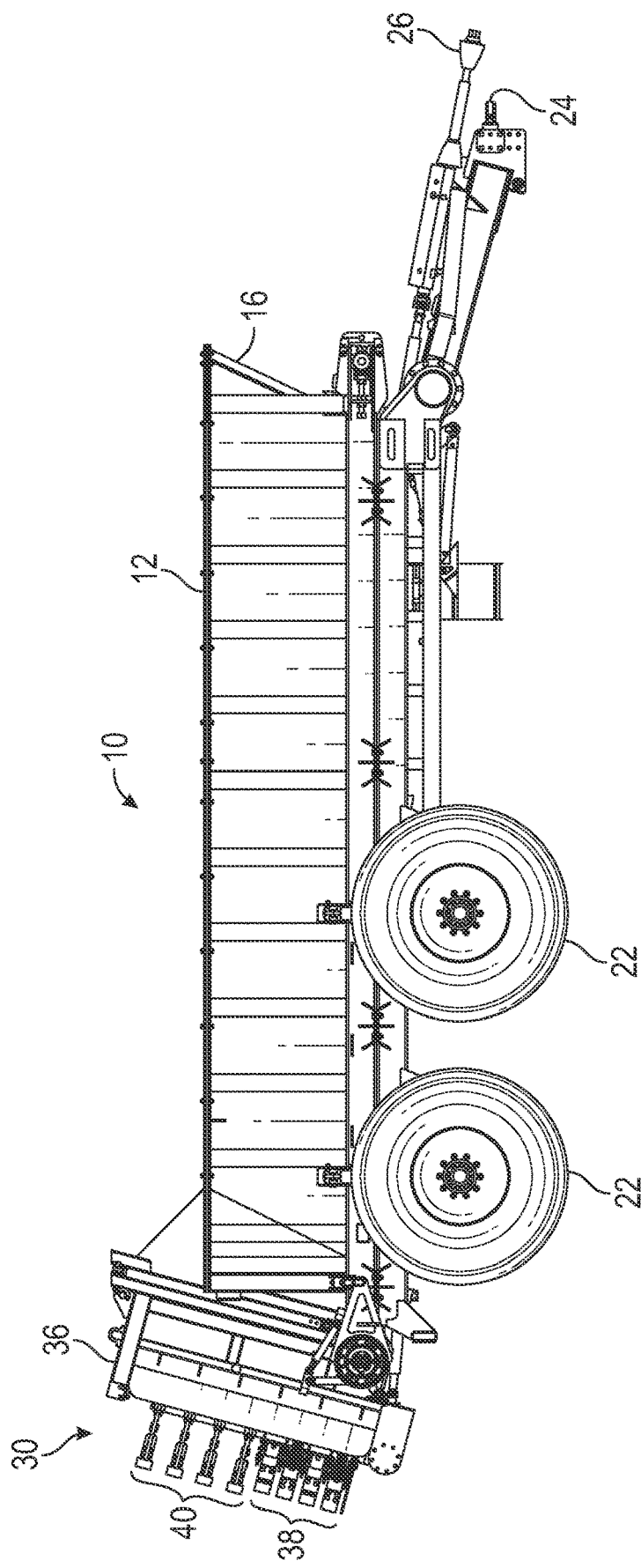
FIG. 3 is a side elevation view of the spreader.
Figure 4:
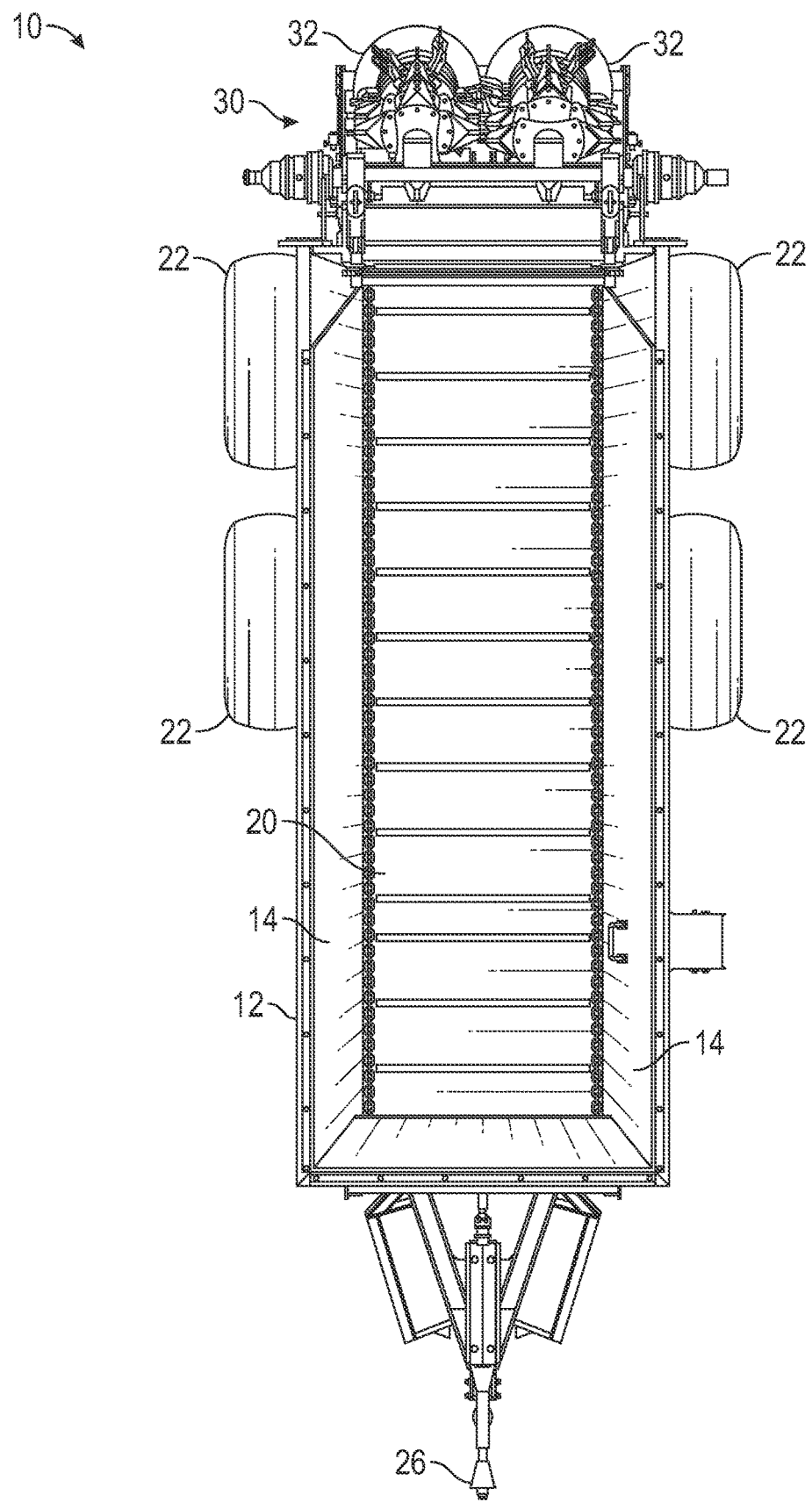
FIG. 4 is a top plan view of the spreader.
Figure 5:
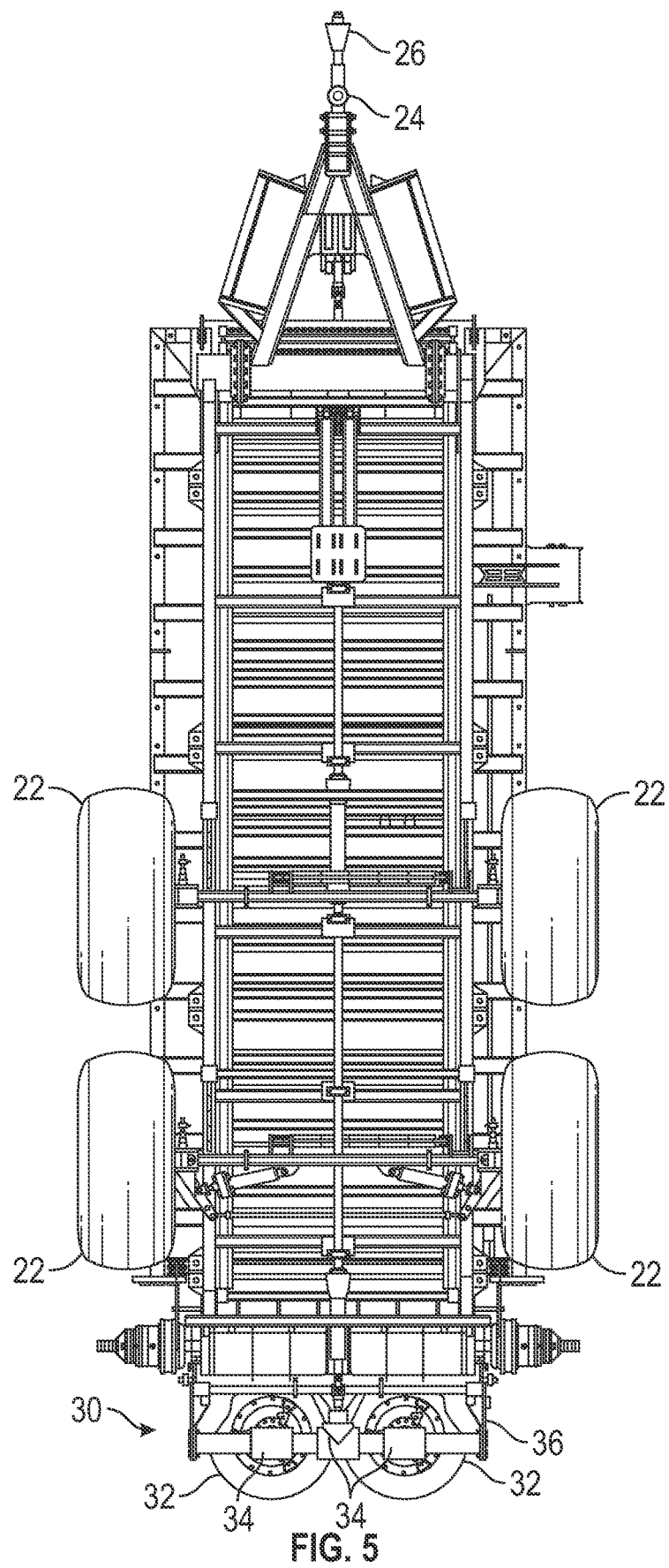
FIG. 5 is a bottom plan view of the spreader.
Figure 6:
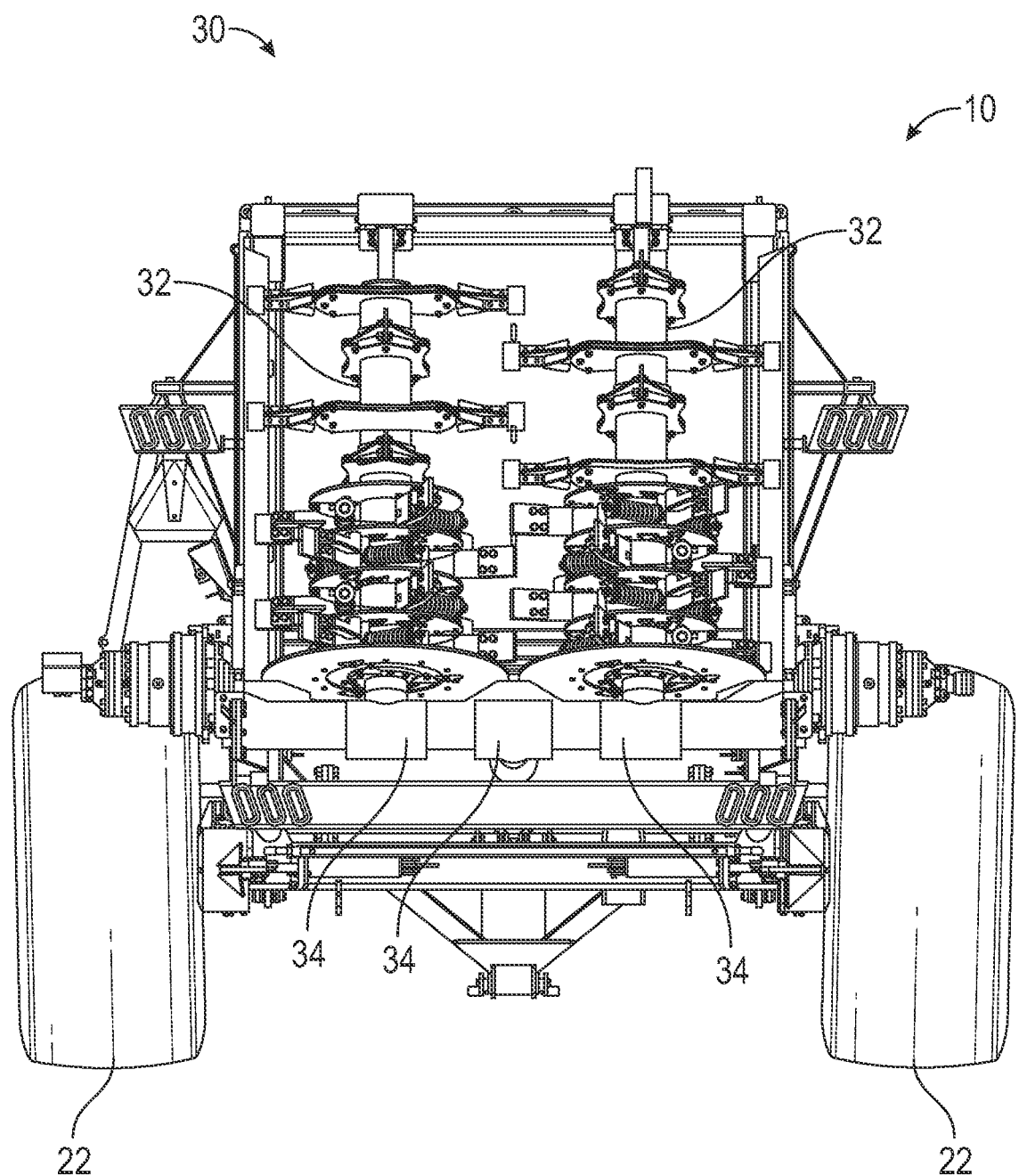
FIG. 6 is a rear elevation view of the spreader.

The present invention is directed toward the beater assembly 30 at the rear of the wagon 10. In a preferred embodiment, the beater assembly 30 includes a pair of upright, rotatable beaters 32 which are driven by the PTO shaft 26 and gearboxes 34. The beaters 32 are supported in a frame 36, and as best seen in FIG. 3, inclined forwardly from top to bottom. The beaters 32 rotate in opposite directions, with the left beater (viewed form the rear) rotating clockwise and the right beater rotating counterclockwise.

Each beater 32 includes a lower set of paddle assemblies 38 and an upper set of paddle assemblies 40. While the drawings show four sets of upper and lower paddle assemblies 38, 40, more or less sets may be utilized.

Figure 7A:
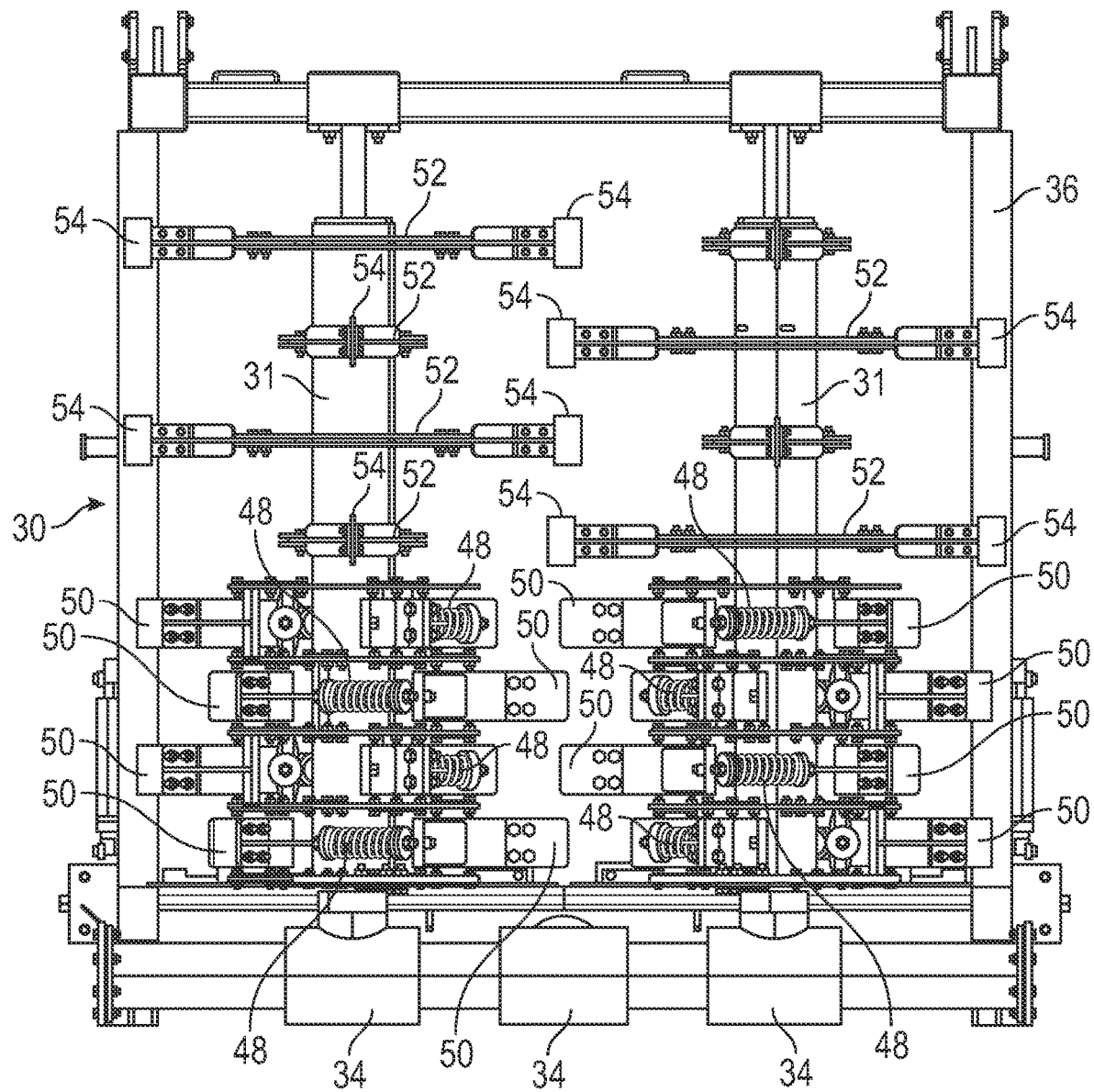
FIG. 7A is a rear elevation view of the beater assembly for the spreader wagon, according to the present invention.
Figure 9:
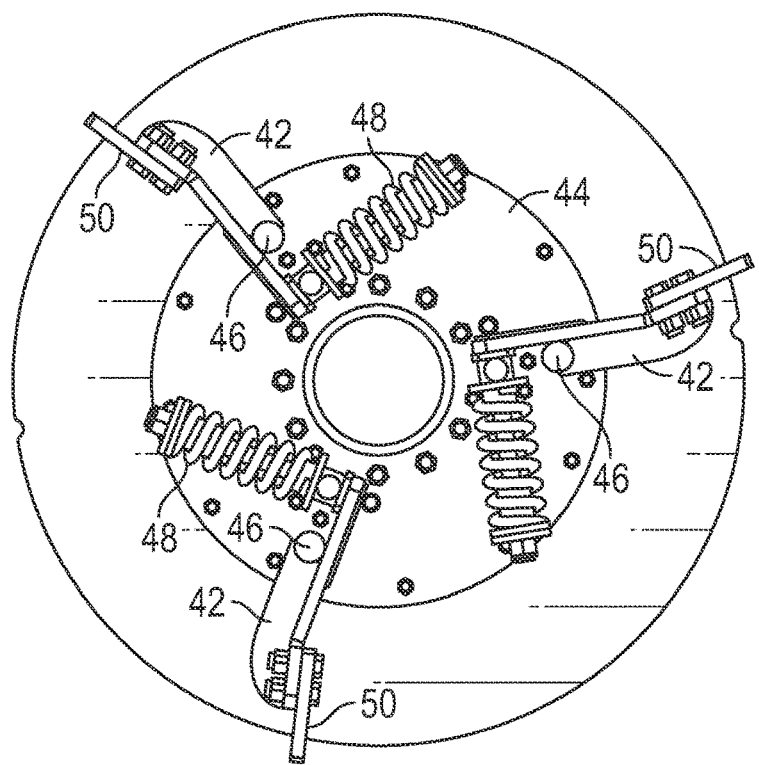
FIG. 9 is a top plan view of one of the spring-biased paddle assemblies on the lower portion of the beaters.

As shown in FIG. 9, each set or row of lower paddles 38 includes arms 42 pivotally mounted to a support plate 44 for rotation about a shaft or axis 46. The preferred embodiment utilizes three arms 42, though more or less arms may be provided on each plate 44. Each arm 42 is biased by a spring 48 toward the direction of rotation of the beater 32. A blade or paddle 50 is bolted to the end of each arm 42. As best seen in FIG. 7A, the outer edge of the paddles 50 reside in close proximity to the side of the frame 36.

Figure 10:
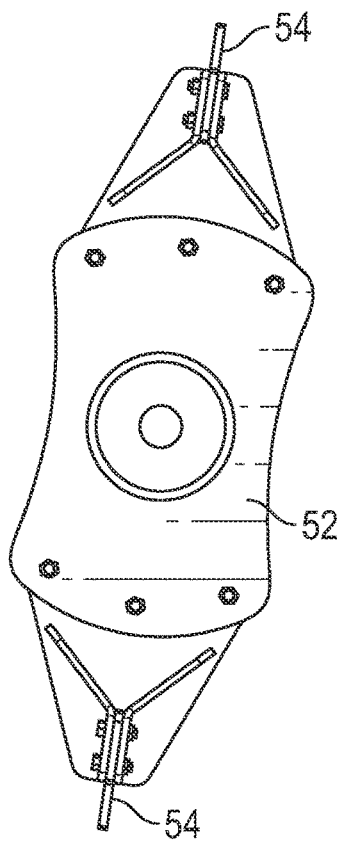
FIG. 10 as a top plan view of one of the upper paddle assemblies of the beaters.
Figure 11:
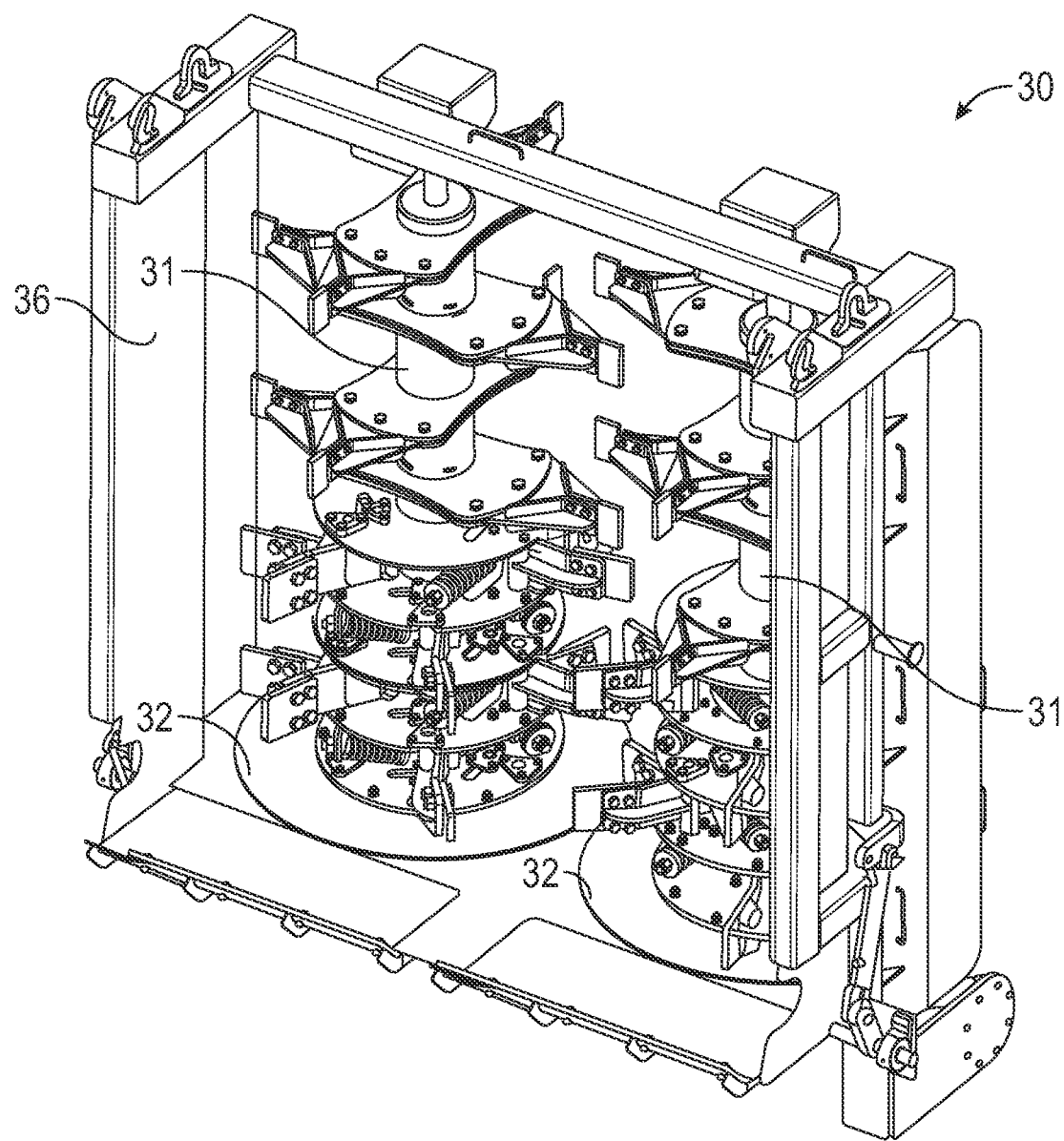
FIG. 11 is a front perspective view of the beater assembly, according to the present invention.
Figure 12:
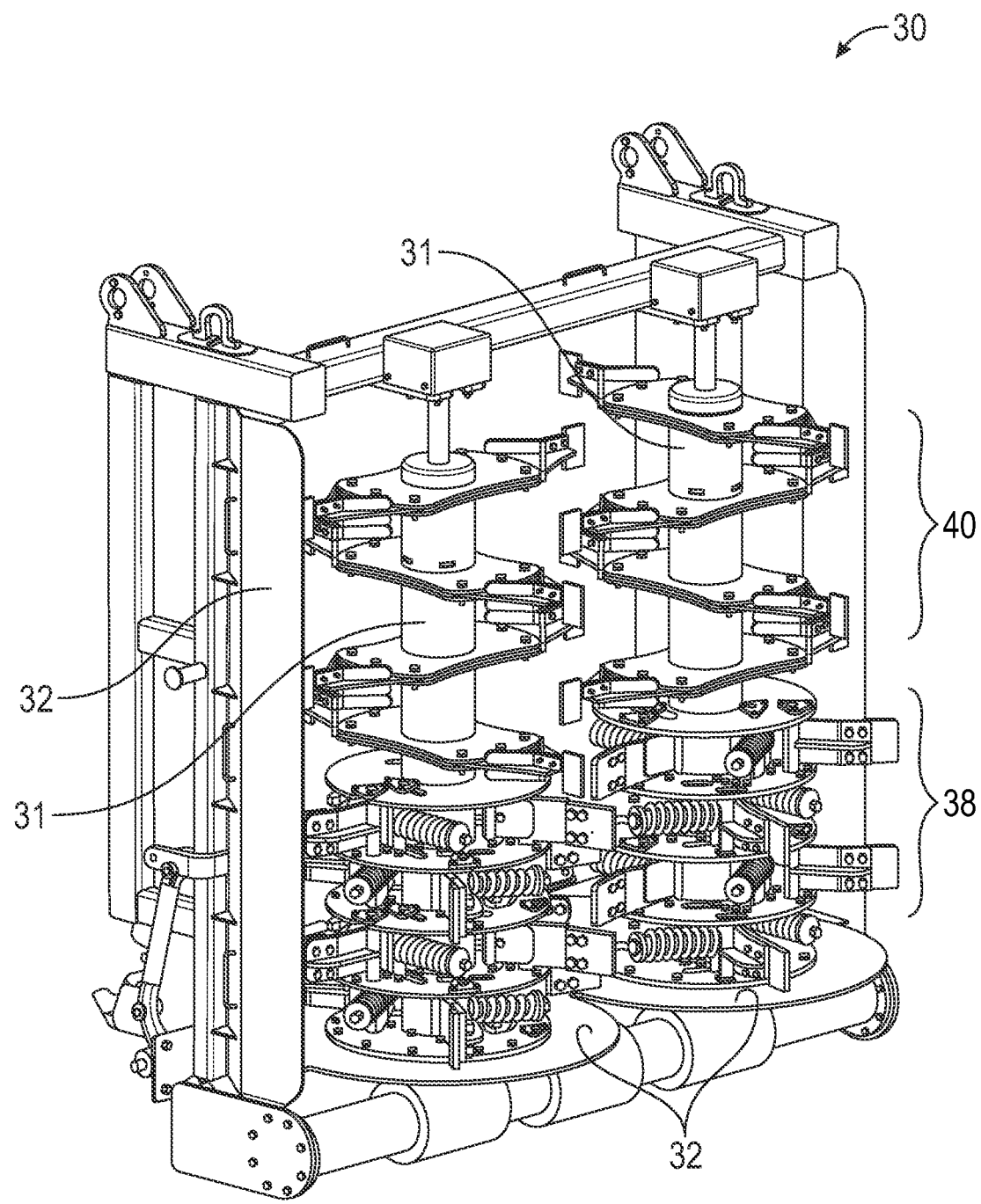
FIG. 12 is a rear perspective view of the beater assembly, according to the present invention.

As shown in FIG. 10, each of the upper paddle assemblies includes an arm 52 extending in opposite directions from the pivot shaft or axle 31. A paddle 54 is bolted or otherwise secured to the opposite ends of the arm 52. The drawings show the upper paddle assembly 40 as having only two pads 54, though more pads can be provided, if desired.

The pads 50, 54 are preferably made of a hard, weather-resistant material, such as steel, and can be replaced if damaged or worn.

The arms 42 and plates 44 of the lower paddle assembly 38 are vertically spaced, with the arms of one plate being radially offset with respect to the arms of an adjacent plate. Similarly, the arms 52 of the upper paddle assembly 40 are vertically spaced and radially offset from adjacent arms. Thus, the pads 50 in one row of the lower paddle assembly 38 are vertically and radially offset with respect to the pads 50 in the adjacent row, and the arm 52 in one row of the upper paddle assembly 40 is vertically and radially offset with respect to the arm 52 in an adjacent row.

Figure 7B:
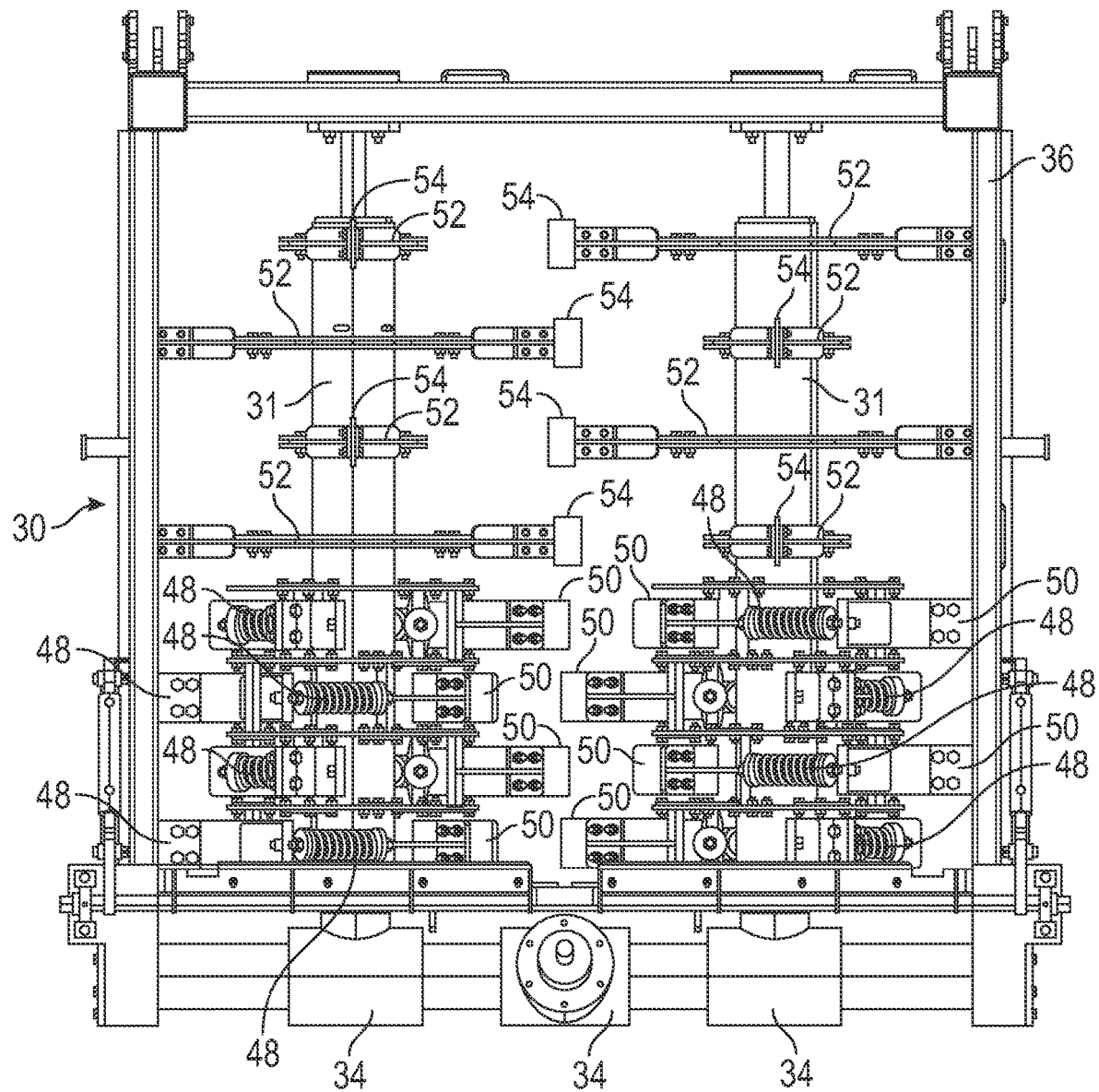
FIG. 7B is a front elevation view of the beater assembly shown in FIG. 7A.
Figure 8:
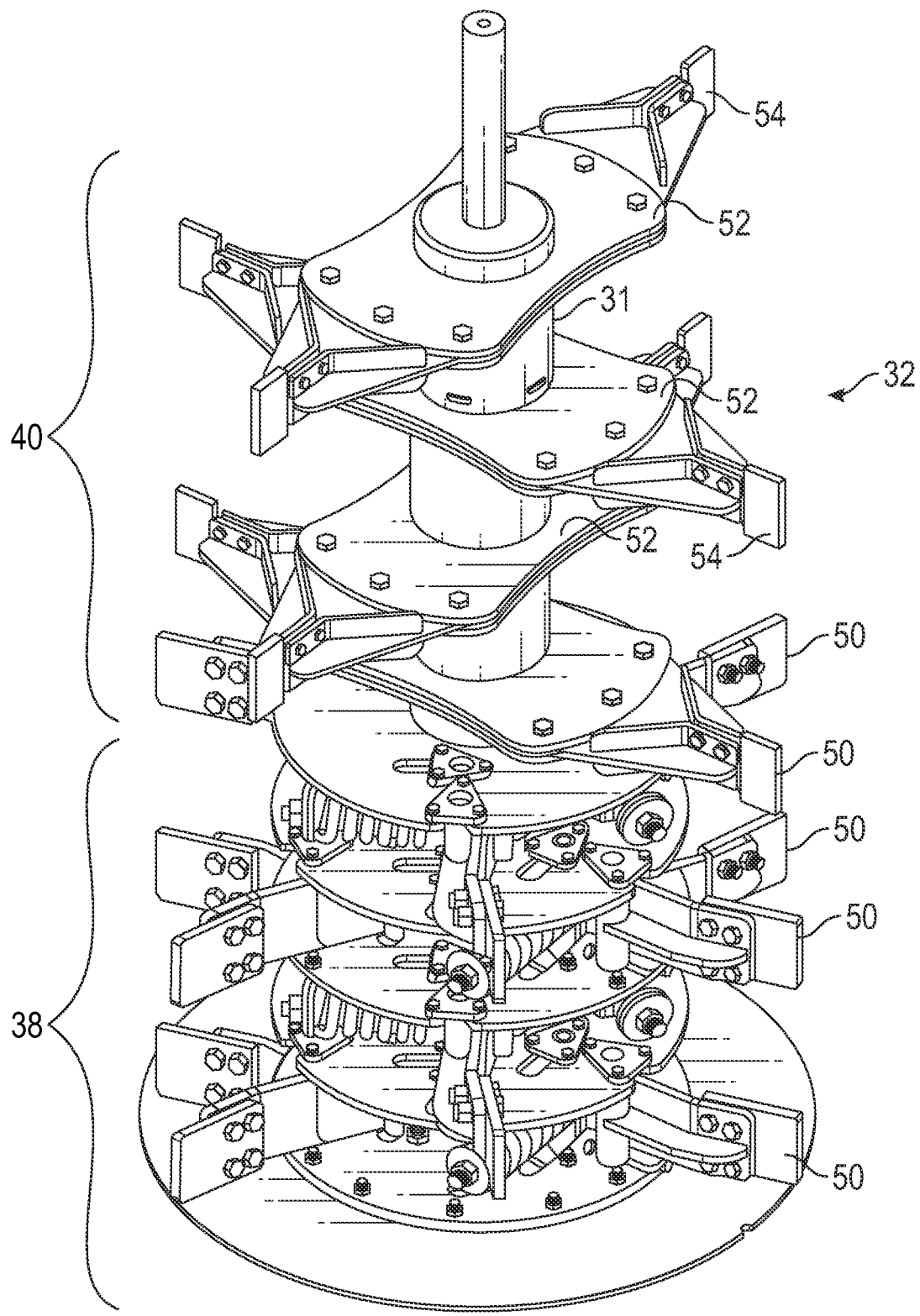
FIG. 8 is a perspective view of one of the beaters with the spring-loaded breakaway paddles of the present invention.

As best seen in FIGS. 7A and 7B, the pads 50 and 54 of the left beater overlap with respect to the pads of the right beater along the center line between the two beaters 32. This middle overlap prevents manure or other solid material from falling on the ground in a line of unspread material. The paddles 50, 54 on the opposing beaters 32 in each row (at the same elevation to one another) are radially offset so as to rotate through the center line alternatingly at different times to avoid hitting one another while rotating. The beaters 32 also have a larger diameter and greater weight than conventional manure spreaders. The larger diameter of the beaters increases the tip speed of the paddles 50, 54 so as to impact the manure or solid material with a greater force, and thereby provide a wider spread pattern on the field. The increased weight of the beaters acts as a flywheel and stores energy so that rotational speed of the beaters is maintained as the paddles hit the manure or other solid material. Also, the offset orientation of the pads 50, 54 provides open space there between, so as to eliminate or minimize plugging of the beaters during operation. The close tolerance between the pads 50, 54 and the side edges of the frame 36 facilitates shear of any type of material adjacent the frame sides, and thereby maintain cleaner paddles for improved distribution of material during the spreading process.

The spring-loaded arms 42 of the lower paddle assembly 38 break away if an obstacle is encountered, such as a large block or clump of material, and then the arm returns to the biased position after the blockage is passed. This spring break away action minimizes damage, maintains rotational speed of the beaters 32, and approves overall spread pattern, sizing of material, and operational efficiencies.

It is understood that the spreader of the present invention can be used for various solid materials in addition to manure, such as lime and other manufactured fertilizers.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A solid manure spreader, comprising:
   a wagon for holding solid manure;
   a conveyor extending from front to back in the wagon to carry the solid manure to a rear end of the wagon;
   a pair of beaters rotatably mounted at the rear end of the wagon, the beaters being forwardly inclined from bottom to top and being adapted to rotate in opposite directions from one another;
   the beaters having a plurality of spring-loaded pivotal arms, each arm having inner and outer ends and a pivot axis between the inner and outer ends;
   springs each having a fixed first end and a second end connected to the inner end of one of the arms to bias the inner and outer ends of the one arm in a same direction of rotation as a direction of rotation of the beater; and
   each arm having a paddle removably and rigidly fixed to the outer end to dispense the manure from the rear end of the wagon onto a field.

2. The solid manure spreader of claim 1 wherein the paddles overlap a center vertical plane between the beaters.

3. The solid manure spreader of claim 1 wherein the paddles have outer edges adjacent a side edge of the wagon.

4. The solid manure spreader of claim 1 wherein the paddles of the pair of beaters have vertically overlapping edges.

5. The solid manure spreader of claim 1 wherein each beater has a plurality of rows of the paddles, and the paddles at each row of the beaters are rotationally offset from one another to alternatingly pass through a center line.

6. The solid manure spreader of claim 1 wherein the arms on each beater are pivotally mounted on vertically separated plates, and the first ends of the springs being fixed to the plates.

7. The solid manure spreader of claim 6 wherein the arms on vertically adjacent plates are radially offset from one another.

8. The solid manure spreader of claim 1 wherein each of the arms has a longitudinal arm axis, and the spring has an axis perpendicular to the longitudinal axis.

9. The solid manure spreader of claim 1 wherein the beaters each have a set of non-pivotal arms with paddles on ends of the non-pivotal arms.

10. The solid manure spreader of claim 9 wherein the non-pivot arms are spaced above the pivotal arms.

11. The solid manure spreader of claim 1 wherein the fixed first end of the spring is spaced farther from a rotational axis of the beater than the second end of the spring.

12. A material spreader to dispense particulate material onto a field, comprising:
    a wagon for holding the material;
    a conveyor extending from front to back in the wagon to carry the material to a rear end of the wagon;
    a pair of beaters rotatably mounted at the rear end of the wagon;
    the beaters having a plurality of pivotal arms, and each arm having an inner end and an outer end, and a pivot axis between the inner and outer ends;
    a paddle on the outer end of each arm to dispense the material from the wagon when the conveyor is actuated and the beaters rotate; and
    a spring on the inner end of each arm to bias an outer end of the arm toward a direction of rotation of the arm.

13. The spreader of claim 12, wherein the paddles are rigid extensions of the arms.

14. The spreader of claim 12, wherein each beater includes a rotatable shaft, with a plurality of spaced plates fixed to the shaft, and the arms being pivotally mounted to the plates.

15. The spread of claim 12 wherein each spring has a fixed first end and a second end attached to the arm.

16. The spreader of claim 15 wherein the second end of the spring is spaced radially closer to a rotational axis of the beater than the first end of the arm.

17. A manure spreader for distributing manure onto a field, comprising: a wagon for holding manure; a conveyor to move the manure toward a rear end of the wagon; a pair of upright beaters at the rear end of the wagon; each beater having: an upright rotatable shaft, a plurality of vertically spaced plates fixed on the shaft, a plurality of arms pivotally mounted on the plates so as to extend outwardly beyond the plates and to rotate with the shaft in a first direction, and having a paddle, wherein each arm has an inner end fixed to one of the plates and an outer end, with a pivot axis between the inner and outer ends; and a plurality of springs each having a fixed first end and a second end connected to the inner end of one of the arms so as to urge the one arm in the first direction.

18. The manure spreader of claim 17 wherein the paddle is removably mounted on an outer end of the arm.

19. The manure spreader of claim 17 wherein the beater has a rotational axis, and the first end of the spring is spaced further from the rotational axis than the second end of the spring.

\* \* \* \* \*